Dec. 18, 1934.  E. BUGATTI  1,985,145
FRONT AXLE FOR AUTOMOBILE VEHICLES
Filed July 28, 1933    2 Sheets-Sheet 1
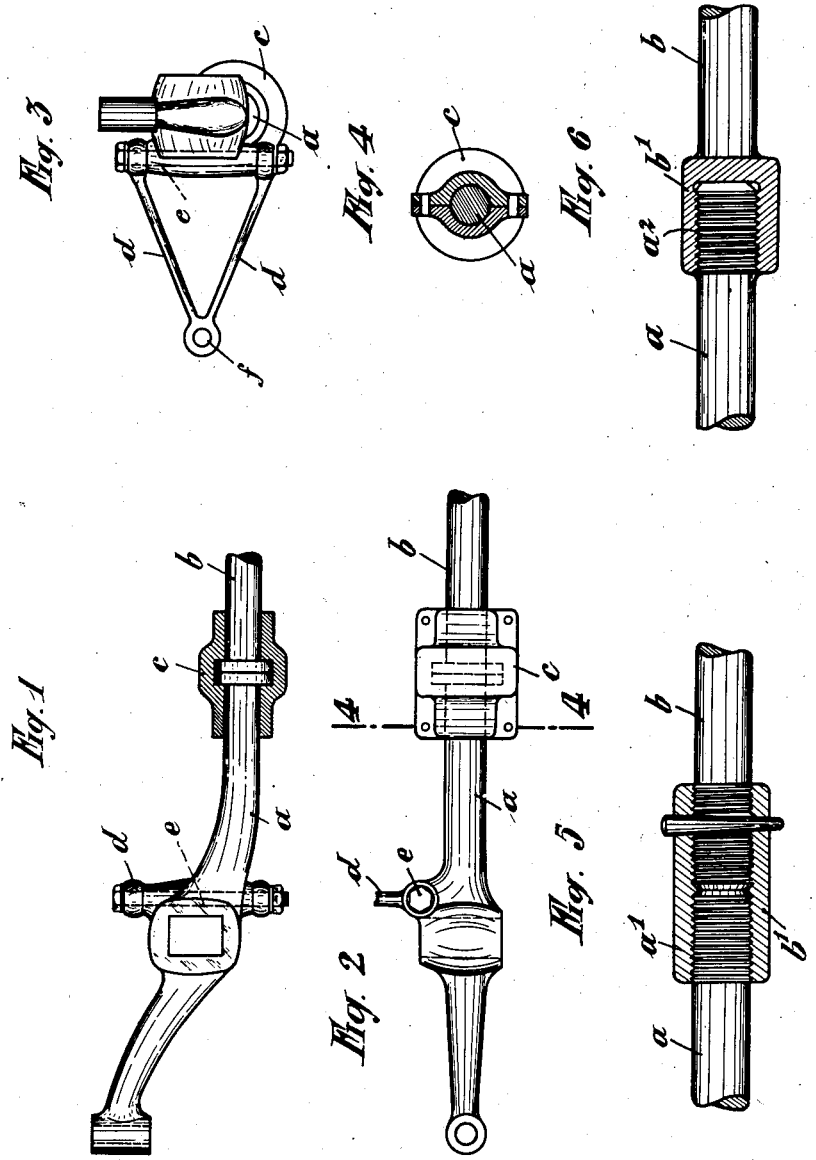

Dec. 18, 1934.  E. BUGATTI  1,985,145
FRONT AXLE FOR AUTOMOBILE VEHICLES
Filed July 28, 1933    2 Sheets-Sheet 2
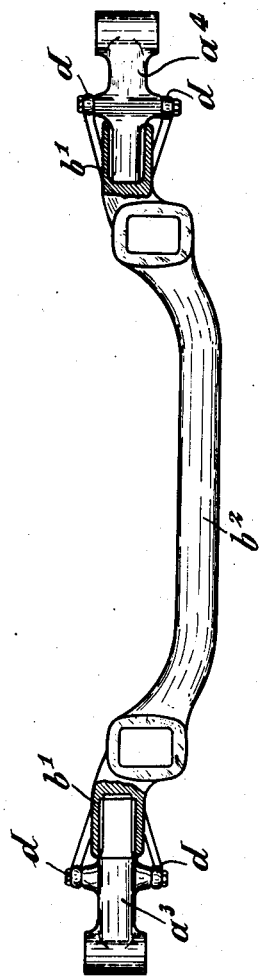
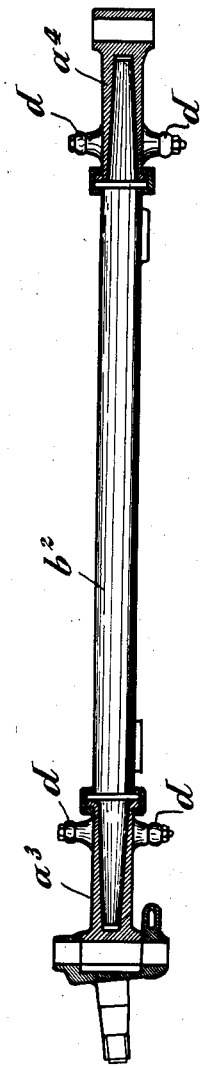
Inventor
Ettore Bugatti
By Munn & Lewis
Attorneys Patented Dec. 18, 1934　　　　　　　　　　　　　　　　　　　　　　1,985,145

UNITED STATES PATENT OFFICE 1,985,145

FRONT AXLE FOR AUTOMOBILE VEHICLES

Ettore Bugatti, Molsheim, France

Application July 28, 1933, Serial No. 682,702
In France August 8, 1932

4 Claims. (Cl. 267—66)

It is known that a front axle having suspension springs fixed in the ordinary fashion cannot withstand a very high torsion resulting from a braking or a motive traction.

In order to obviate this drawback, it has been proposed to fit the front axle with connecting rods or other similar organs intended to maintain the axle in position in a more or less rigid manner by opposing a resistance to the reversing torque acting in the direction of rotation of the wheels. However, these arrangements have many drawbacks due to the relative displacement of the front axle with reference to the frame of the automobile.

The object of the present invention is to provide an improved front axle which is free from all these drawbacks. To this effect, the axle according to my invention consists of two or more portions suitably assembled together so that said portions may have a relative angular displacement, these portions being further strengthened by independent reaction rods opposing the efforts due to the braking torque.

Preferred embodiments of my invention will be hereinafter described with reference to the accompanying drawings given merely by way of example, and in which:

Figs. 1, 2 and 3 are a front view, a plan view and a side view respectively of an improved front axle according to my invention;

Fig. 4 is a sectional view on the line 4—4 of Fig. 2;

Figs. 5 and 6 are sectional views corresponding to different embodiments of my invention;

Figs. 7 and 8 are front views showing other embodiments of my invention in which the front axle is made of three distinct parts.

As shown in the drawings, the improved front axle according to my invention is cut in its middle part, that is to say consists of two portions $a$, $b$ connected by a box or bearing $c$ that permits one of said portions $a$ to move angularly with respect to the other portion $b$.

Each of these portions is provided with a reaction rod $d$ preferably mounted as shown in Figs. 1-3 that is to say, consisting of a V-shaped piece pivoted about a vertical spindle $e$ carried by the axle, and about a horizontal spindle $f$ carried by the frame.

Owing to this arrangement, the two connecting rods can follow the deformations of the axle, that is to say are permitted not to remain parallel when said axle moves with respect to the frame. The presence of these two reaction rods reduces the reaction stresses on the steering wheel, so that the arrangement according to my invention has the advantage of ensuring a smooth steering of the vehicle.

It is obvious that the connection between the two portions $a$ and $b$ of the axle can be made in any suitable way, for instance as shown in Fig. 5, in which, portion $a$ is provided at its end with a screw threaded part $a^1$ which is screwed in a sleeve $b^1$ keyed on portion $b$. I may also utilize the arrangement of Fig. 6 in which sleeve $b^1$ is integral with the end of portion $b$.

In the normal position, it is preferable that the ends of portions $a$ and $b$ should be in contact with each other.

In the embodiments of Figs. 7 and 8, the axle is made of three portions, a central portion $b^2$ and two outer portions $a^3$ and $a^4$ that carry the articulations of the stub axles.

In Fig. 7, portions $a^3$ and $a^4$ are engaged in sleeves $b^1$ provided at either end of the middle portion $b^2$.

In the embodiment of Fig. 8, the ends of central portion $b^2$ are of conical shape and are engaged in sleeves provided in portions $a^3$ and $a^4$.

While I have described what I deem to be practical and efficient embodiments of my invention, it should be well understood that I do not wish to be limited thereto as there might be changes made in the arrangement, disposition and form of the parts without departing from the principle of my invention, as comprehended within the scope of the appended claims.

What I claim is:

1. In an automobile vehicle including a frame, the combination of a front axle made of at least two separate portions placed in line with each other, means for connecting said portions together so that they can have relative angular displacements about an axis parallel to the direction of the axle, and at least one triangle-shaped rigid structure pivoted on the one hand to one of said portions about a vertical axis parallel to one of the sides of said triangle and, on the other hand to said frame about a horizontal axis at right angles to said triangle, for opposing the effects of braking and tractive torques.

2. In an automobile vehicle including a frame, the combination of a front axle made of two separate portions placed in line with each other, a flange at each of the adjacent ends of said portions, a box surrounding said flanges for connecting said portions together so that they can have relative angular displacements about an axis parallel to the direction of the axle, and at least one triangle-shaped rigid structure pivoted on the one hand to one of said portions about a vertical axis parallel to one of the sides of said triangle and, on the other hand to said frame about a horizontal axis at right angles to said triangle, for opposing the effects of braking and tractive torques.

3. A combination according to claim 1 in which the means for connecting together the portions of the axle consists of a screw threaded sleeve carried by one of said portions and in which the end of the other portion can be screwed.

4. In an automobile vehicle including a frame, the combination of a front axle made of three separate portions placed in line with each other, means for connecting the central portion with each of the two end portions so that they can have relative angular displacements about an axis parallel to the direction of the axle with respect to said central portion, and at least one triangle-shaped rigid structure pivoted on the one hand to one of said portions about a vertical axis parallel to one of the sides of said triangle and, on the other hand to said frame about a horizontal axis at right angles to said triangle, for opposing the effects of braking and tractive torques.

ETTORE BUGATTI.